No. 663,113. Patented Dec. 4, 1900.
J. J. BERRIGAN.
CENTRIFUGAL CREAM SEPARATOR.
(Application filed May 24, 1900.)
(No Model.)
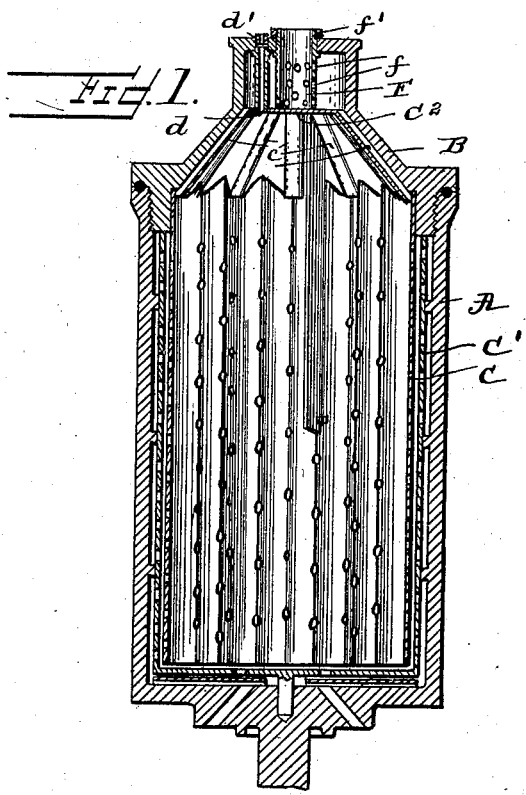
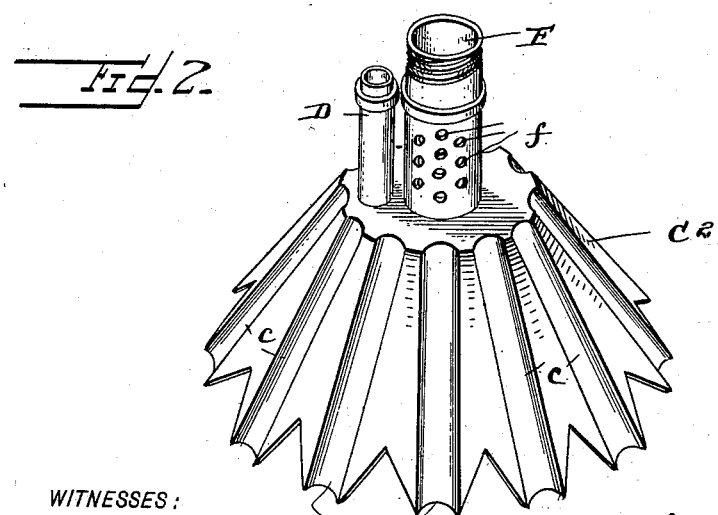
WITNESSES:
Jesse B. Heller,
M. F. Ellis.
INVENTOR
John Joseph Berrigan
BY
Harding & Harding
ATTORNEYS

UNITED STATES PATENT OFFICE.

JOHN JOSEPH BERRIGAN, OF AVON, NEW YORK, ASSIGNOR TO THE DE LAVAL SEPARATOR COMPANY, OF NEW JERSEY.

CENTRIFUGAL CREAM-SEPARATOR.

SPECIFICATION forming part of Letters Patent No. 663,113, dated December 4, 1900.

Application filed May 24, 1900. Serial No. 17,780. (No model.)

*To all whom it may concern:*

Be it known that I, JOHN JOSEPH BERRIGAN, a citizen of the United States, residing at Avon, county of Livingston, and State of New York, have invented a new and useful Improvement in Centrifugal Cream-Separators, of which the following is a full, clear, and exact description, reference being had to the accompanying drawings, which form a part of this specification.

My invention relates to an improvement in a certain class of cream-separators, and has for its object to enable all parts of such machines to be more readily and thoroughly cleaned.

My improvement relates to that class of separators in which the interior of the bowl is provided with an angular or polygonal partition permanently secured to the cover of the bowl and in which a corrugated inclined plate is placed within said polygonal partition and also secured to the cover of the bowl. The full milk is discharged onto the top of this inclined plate and escapes in corrugations between the edge of the inclined plate and the polygonal partition. The plate has an orifice in the cream zone of the bowl, ending at its upper surface in a pipe leading to the cream-outlet orifice in the upper surface of the neck of the bowl. As this plate is close to the neck of the bowl, it is difficult to clean the corrugations from below. Also it is almost impossible to get at the upper surface of this plate, as in this character of machines the cream-orifice is in the cap or cover of the top of the neck of the bowl, and the annular orifice in said cap or cover for the delivery of the full milk is too small to allow for the insertion of cleaning devices. Thus it has been difficult to operate this machine for any length of time successfully.

I will now describe the embodiment of my invention illustrated in the drawings, whereby I am enabled to so change the construction of the bowl as to enable the corrugations on the upper surface of the plate to be readily cleaned.

Figure 1 is a sectional view showing my improved device. Fig. 2 is a perspective view of the plate $C^2$.

A is the bowl proper; B, the cover or neck. Within the bowl are the polygonal partitions C and C', partition C being loose within the bowl and partition C' being within the polygonal partition C. Within the polygonal partition C' is a conical plate $C^2$, corrugated, as shown at c. This plate prior to my invention was permanently secured to the cover of the bowl by being soldered thereto. Its outer edges are connected to corrugations in the partition C', so that a space is left between the outer edge of the plate $C^2$ and the partition C'. There is also a space between the top of this plate $C^2$ and the top of the bowl. In order to enable the top of this plate $C^2$ and its corrugations to be properly cleaned, I make it removable from the cover in the following manner: Connected to the top of the plate $C^2$ is the pipe F, terminating at the lower end on the top of the plate $C^2$ and provided with a series of lateral orifices $f$. The top of the pipe F is externally threaded and projects through the orifice in the neck of the bowl and is secured to the cover of the bowl by a nut $f'$. The cream-discharge pipe D merely enters said discharge-outlet orifice $d'$. By this construction the plate $C^2$ may be entirely separated from the cover by removing the nut $f$ and then removing the plate $C^2$, with pipes F and D, from the bowl, and they may be readily cleaned.

Having now fully described my invention, what I claim, and desire to protect by Letters Patent, is—

1. In a centrifugal cream-separator of the character described, in combination with a conical plate, a pipe secured to and projecting from the upper surface of said plate adapted to pass through the orifice in the cover of the bowl, said pipe having lateral orifices opening into the space between the plate and cover, and removable means to secure said pipe to the cover of the bowl.

2. In a centrifugal cream-separator of the character described, in combination with a conical plate, a pipe secured to and projecting from the upper surface of said plate adapted to pass through the orifice in the cover of the bowl, said pipe having lateral orifices adjacent to the upper surface of the conical plate, said pipe being threaded at its end and a nut to secure said threaded end to the cover of the bowl.

3. In a centrifugal cream-separator of the character described, in combination with a conical plate, a pipe secured to and projecting from the upper surface of said plate adapted to pass through the orifice in the cover of the bowl and removable means to secure said pipe to the cover of the bowl, a second pipe extending through said plate and adapted to register with the cream-discharge-outlet orifice of the bowl.

4. In a centrifugal cream-separator of the character described, in combination with a conical plate, a pipe secured to and projecting from the upper surface of said plate adapted to pass through the orifice in the cover of the bowl, said pipe having lateral orifices adjacent to the upper surface of the conical plate, and removable means to secure said pipe to the cover of the bowl, a second pipe extending through said plate and adapted to register with the cream-discharge-outlet orifice of the bowl.

5. In a centrifugal cream-separator of the character described, in combination with a conical plate, a pipe secured to and projecting from the upper surface of said plate adapted to pass through the orifice in the cover of the bowl, said pipe being threaded at its end, a nut to secure said threaded end to the neck of the bowl, a second pipe extending through said plate and adapted to register with the cream-discharge-outlet orifice of the bowl.

6. In a centrifugal cream-separator of the character described, in combination with a conical plate, a pipe secured to and projecting from the upper surface of said plate adapted to pass through the orifice in the cover of the bowl, said pipe having lateral orifices adjacent to the upper surface of the conical plate, said pipe being threaded at its end, a nut to secure said threaded end to the neck of the bowl, a second pipe extending through said plate and adapted to register with the cream-discharge-outlet orifice of the bowl.

In testimony of which invention I have hereunto set my hand at New York, N. Y., on this 5th day of May, 1900.

JOHN JOSEPH BERRIGAN.

Witnesses:
JOHN S. PAUL,
M. F. ELLIS.